Patented Nov. 29, 1949

2,489,366

UNITED STATES PATENT OFFICE 2,489,366

RESINOUS CONDENSATES FROM POLY-AMINES AND ALDEHYDO-CARBOXYLIC ACIDS

Herman A. Bruson, Rydal, and Warren D. Niederhauser, Philadelphia, Pa., assignors, by mesne assignments, to Rohm & Haas Company, Philadelphia, Pa., a corporation of Delaware No Drawing. Application February 21, 1946, Serial No. 649,391

8 Claims. (Cl. 260—72)

This invention relates to new synthetic resins. Broadly, it deals with resinous condensation products of polyamines and aldehydo non-aromatic monocarboxylic acids or esters thereof.

The objects of this invention include the production of a new type of resinous condensate, the provision of resins useful in coating compositions, and useful for laminating paper, cloth, wood, glass, or other materials, and the provision of resins useful in conjunction with fiber-forming materials. It is also an object to provide resins free from acidity.

We have found that resins meeting a great range of such requirements and useful for a large variety of these and other applications are obtained by reacting by heating together a monoaldehydo-monocarboxylic acid, in which the —CHO group and the —COOH group are separated by at least two aliphatic carbon atoms, or an ester thereof, in which the alcohol portion may be displaced during the reaction, and a polyamine which contains a primary amino group and another amino group which is secondary or primary, the nitrogen atoms of these amine groups being separated by at least four intervening atoms. It is desirable to ensure production of the types of resins here contemplated that there be available for reaction with the aldehyde group in the monocarboxylic acid or ester thereof about one equivalent of a primary amino group in the polyamine. There should also be present a second primary or a secondary amine group in a proportion which is about equivalent to the carboxylic acid or ester function.

Aldehydo-carboxylic acids which meet the requirements of this invention are those in which an open or aliphatic chain of at least two carbon atoms occurs between the aldehydo group and the carboxyl group. These acids may be, therefore, purely aliphatic or mixed aliphatic compounds, in the latter case including arylaliphatic and alicyclicaliphatic. The purely aliphatic aldehydo-carboxylic acids and their simple esters form a sub-class of particular interest. The resins formed therefrom with diamines are particularly suitable in connection with fiber, film, and foil formation.

One class of open-chained aldehydo-monocarboxylic acids of importance may be represented by the formula OHC—$C_nH_{2n}$—COOH, wherein $C_nH_{2n}$ is an alkylene group, straight or branched, of at least two carbon atoms in length and $n$ is an integer having a value of at least two, varying usually from two to sixteen.

The straight-chained aldehydo-acids may be summarized by the formula

OHC—$(CH_2)_n$—COOH wherein $n$ is an integer of at least two. Representative of these are omega-aldehydo-propionic acid, omega-aldehydo-butyric acid, omega-aldehydo-valeric acid, omega-aldehydo-octoic acid. In place of these specific acids, there may be used the various homologues.

Another important group of acids comprises branch-chained aldehydo-acids which have the general formula

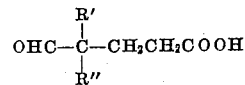

wherein R' is hydrogen or an alkyl group and R" is an aliphatic hydrocarbon group. This group may be saturated or unsaturated. Typical aldehydo-acids coming within this formula are β-carboxy-ethyl diethyl acetaldehyde,

OHCC$(C_2H_5)_2$CH$_2$CH$_2$COOH or β-carboxy-ethyl ethyl butyl acetaldehyde,

OHCC$(C_2H_5)(C_4H_9)$CH$_2$CH$_2$COOH or β-carboxyethyl ethyl butenyl-1 acetaldehyde, OHCC$(C_2H_5)$(CH=CHC$_2H_5$)CH$_2$CH$_2$COOH, or β-carboxyethyl dimethyl acetaldehyde,

OHCC$(CH_3)_2$CH$_2$CH$_2$COOH or homologues thereof, including those described in United States Patent No. 2,342,607, issued February 22, 1944. From aldehydo-acids of this type resins may be prepared with rather unique properties due, evidently, to the branched-chain structure.

In another useful class of aldehydo-monocarboxylic acids and esters which meet the requirements of this invention are alicyclicaliphatic compounds such as. are formed by the addition of acrolein or crotonaldehyde to aliphatic carboxylic acids or esters having a conjugate diolefinic linkage, such as eleostearic or licanic acids, or the esters thereof. Aldehydo-monocarboxylic acids and esters of this type are described in application Serial No. 623,442, filed October 19, 1945, now abandoned. Resins prepared from polyamines and these acids differ in some respects from resins obtained from the classes of acids described above, being generally softer and having solubilities in a greater variety of solvents. They are highly effective as resinous, non-volatile, non-migrating softeners for other resinous materials.

Instead of the free acids described above, there may be used simple esters of these acids with the lower aliphatic alcohols. When the carboxyl group reacts with an amine group, the alcohol group is displaced and can be volatilized from the resin being formed. Esters of methyl, ethyl, propyl, and butyl alcohol are particularly susceptible to the resin formation herein described, yet esters of other lower aliphatic alcohols, such as hexyl or 2-ethyl hexyl, may be used with the same end effect. Thus, there may be used esters of aldehydo non-aromatic carboxylic acids and of any lower aliphatic saturated alcohol.

The polyamines which may be used may be classified on the basis of the number of hydrogen-bearing nitrogen atoms into two groups, diamines and polyamines of a functionality greater than two. When linear-type polymers are desired, the diamines having one primary amino group and an amino group which is primary or secondary are used. When other types of resins are desired, triamines, tetramines, or other higher polyamines may be used.

Alkylene primary diamines form a group of particular importance. These may be designated by the formula $NH_2-C_nH_{2n}-NH_2$, wherein $C_nH_{2n}$ is an alkylene chain of at least four carbon atoms and $n$ is an integer of at least four, usually varying from four to ten. Typical of these diamines are tetramethylenediamine, pentamethylenediamine, hexamethylenediamine, nonamethylenediamine, and decamethylenediamine.

Related to these diamines are arylaliphatic diamines of the formula $NH_2C_6H_4(CH_2)_nNH_2$, where $n$ is an integer of 1, 2, 3, 4, 5, etc., there being at least four carbon atoms between the two amino groups in any of the diamines of this general formula which may be taken for reaction with an aldehydo-carboxylic acid according to this invention. Also, diamines such as:

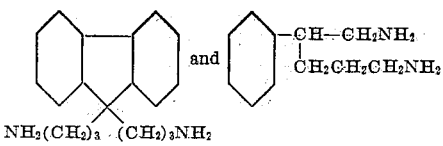

may be used.

Aromatic diamines form another important group of amines, typical of which are $NH_2C_6H_4NH_2$ and $NH_2C_6H_4C_6H_4NH_2$ In the case of these diamines as with all of the diamines described there must be at least four carbon atoms between amino groups. This rule excludes possible isomers of the formulas just given which do not meet this prescribed requirement. Other useful diamines containing cycles include 1,4-diaminocyclohexane and its homologues and also diamines such as:

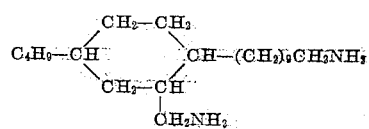

In cases in which the final resin is to be insoluble and cross-linked, there may be used amines of higher functionality than two, such as diethylenetriamine, triethylenetetramine, tetraethylenepentamine, and the like, or N,N'-di-aminoethylene propylenediamine.

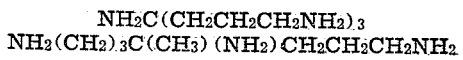

or other polyamines of amine functionality greater than two. In these compounds, the more reactive amino groups are separated by chains of at least four carbon atoms with interruption of the carbon chain by nitrogen.

The resins of this invention are formed by mixing one or more aldehydo-monocarboxylic acids or esters thereof, as defined above, with one or more polyamines meeting the requirements shown above and heating the resulting mixture. Volatile products, such as water or alcohol (from esters) are driven off. The temperature is carried to 200° to 300° C. preferably with an inert atmosphere and/or with reduced pressure. An inert gas such as hydrogen or nitrogen may be bubbled through the reaction mixture. Advantageously, the resins are heated in the final stage of preparation in high vacuum to remove volatile matter and to carry the polymers, particularly when linear, to very high molecular weights. If desired, the reaction may be initiated in a solvent, which is removed when resins of higher molecular weight are desired.

Resins ranging from soluble and fusible to insoluble and infusible may be prepared as directed. Resins may be prepared in a fusible state and rendered insoluble and infusible on further heating. Resins may be made which are rubbery and tough to resins which are hard and brittle. These and other properties can be varied by choice of reactants, chain length of reactants, and the extent or degree to which polymerization is carried. Long-chained aliphatic polyamines produce softer, tougher resins than cyclic amines. Long-chained aldehydo-monocarboxylic acids also promote toughness, and the short-chained acids tend to give harder resins. Some resins from suitable diamines and aldehydo-carboxylic acids yield fibers or may be rolled into foils. A most interesting property of the resins of this invention is their compatibility with linear polyamines, polyesters, and polyurethanes which are plasticized therewith.

This invention is illustrated by the following examples.

*Example 1*

A mixture of 8.60 grams of β-carboxyethyl-2-ethylbutyraldehyde.

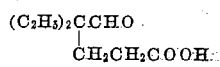

and 5.80 grams of hexamethylene diamine was heated three hours at 100°–150° C. in an atmosphere of nitrogen. The reaction vessel was then evacuated and heated for three hours at 240°–260° C./1 mm. The product was an amber-colored elastic resin. It was soluble in xylenol and in acetic acid but was insoluble in ethanol, butanol, and ethylene dichloride.

*Example 2*

A mixture of eight parts of decamethylene diamine and eight parts of β-carboxyethyl-2-ethylbutyraldehyde was heated for fifteen hours at 160° C. in an atmosphere of nitrogen. The temperature was raised to 220° C. and kept at 220°–250° C. for six hours. The reaction vessel was then evacuated and heated for sixteen hours at 256° C. under 2 mm. pressure. The product was a transparent amber-colored elastic resin. The resin was soluble in xylenol and in acetic acid but was insoluble in ethanol, butanol, benzene, and ethylene dichloride.

*Example 3*

A mixture of five parts of decamethylene diamine and five parts of β-carboxyethyl-2-ethyl-butyraldehyde was heated for three and one-half hours at 240°–260° C. in an atmosphere of nitrogen and then for seven more hours at the same temperature under a vacuum of 3 mm. The product was a light yellow, elastic, thermoplastic resin which, when warm, could be drawn into filaments.

*Example 4*

A mixture of 10 parts of decamethylene diamine, ten parts of β-carboxyethyl-2-ethyl-butyraldehyde, and twenty parts of xylenol was heated under reflux in an atmosphere of nitrogen for ten hours at 160°–220° C. The xylenol was then removed by distillation and the residual resin was heated in vacuum for three hours at 215°–225° C./2 mm. The product was a brittle, light yellow, thermoplastic resin. It was soluble in methanol, ethanol, butanol, ethylene dichloride, and toluene but insoluble in nitromethane and in petroleum ether.

*Example 5*

To a solution of five parts of β-carboxyethyl-2-ethylbutyraldehyde in thirty parts of petroleum ether, there was added five parts of decamethylenediamine. The mixture was heated and stirred for four hours on the steam bath under reflux. The petroleum ether layer was then decanted off and the brown residual syrup was heated for three hours at 210°–220° C./5 mm. while a slow stream of nitrogen was passed through the melt by means of a capillary tube. The produce was an amber elastic resin which could be drawn into filaments. It was soluble in xylenol and in acetic acid but insouble in alcohol, ethylene dichloride, toluene, and in a chloroform-methanol solution.

*Example 6*

A mixture of 8.6 parts of decamethylenediamine and 9.9 parts of 2-carboxyethyl-2-ethylhexen-3-al was heated while a slow stream of nitrogen was bubbled through it by means of a capillary tube. The reaction temperature was held at 110° C. for two hours and at 150° C. for six hours under 2 mm. pressure. At the end of this time, the product was an elastic adhesive resin which was soluble in alchohol, ethylene dichloride, benzene, and dioxane. The resin was heated for an additional five hours at 200°–210° C. under 2 mm. pressure to give an amber, transparent thermoplastic resin. It was soluble in xylenol and in acetic acid but insoluble in ethanol, butanol, benzene, and ethylene dichloride.

*Example 7*

A mixture of 8.6 grams of decamethylenediamine and 10.0 grams of β-carboxyethyl-2-ethylhexaldehyde was heated for four hours at 130°–150° C. while a slow stream of nitrogen was passed through the melt. The pressure was reduced to 2 mm. and the temperature raised to 210° C. and held there for two hours. The product was a transparent yellow elastic resin. It was soluble in xylenol and in acetic acid but was insoluble in benzene, ethanol, and ethylene dichloride.

*Example 8*

A mixture of 1.5 parts of azelaic acid half aldehyde and 1.5 parts of decamethylenediamine was heated to 225°–230° C. for fifteen hours while a stream of nitrogen was passed through the melt. The product was a light yellow resin. It was soluble in xylenol but was insoluble in ethanol, benezene, ethylene dichloride, butanol, and acetic acid.

*Example 9*

A mixture of 3.44 parts of decamethylenediamine and 6.68 parts of an aldehydo-acid having the formula:

$$CH_3(CH_2)_3—C_6H_7(CHO)—CH=CH(CH_2)_7COOH$$

was heated in a stream of nitrogen for one hour at 103°–107° C. and then for one and one-half hours at 200°–210° C. The system was then evacuated to a pressure of 3 mm. of mercury, and the reaction mixture was heated for one hundred thirty minutes at 210°–216° C. while dry nitrogen was passed through the melt by means of a capillary inlet tube. The product was an orange-red, slightly tacky resin. The hot melt could be drawn into elastic fibers. The resin was soluble in butanol, ethylene dichloride, and toluene.

The aldehydo-acid used above is obtainable by heating acrolein in an autoclave in an atmosphere of hydrogen with eleostearic acid at 190°–210° C. and is a pale-yellow oil which boils at 220°–230° C./3 mm.

*Example 10*

A mixture of 3.68 parts of benzidine and 4.00 parts of 2-(β-carboxyethyl)-2-ethylhexaldehyde was heated for six hours at 205°–215° C. while a slow stream of nitrogen was passed through the melt. The system was then evacuated to a pressure of 4 mm. of mercury and heated for an additional three and one-half hours at 205°–215° C. while nitrogen was passed through the melt by means of a capillary inlet tube. The product was a dark, fusible, tack-free resin. It was soluble in ethanol, butanol, and ethylene dichloride but was insoluble in benzene.

*Example 11*

A mixture of 5.40 parts of p-phenylenediamine and 10.00 parts of 2-(β-carboxyethyl)-2-ethylhexaldehyde was heated for four hours at 205°–215° C. while a slow stream of nitrogen was passed through the melt. The system was then evacuated to a pressure of 3 mm. of mercury and heated an additional three hours at 205°–215° C. while nitrogen was passed through the melt by means of a capillary inlet tube. The product was a dark fusible resin, soluble in acetic acid and in xylenol, slightly soluble in n-butanol and in ethylene dichloride, and insoluble in benzene and in alcohol.

*Example 12*

A mixture of 0.82 part of tetramethylenediamine and 1.86 parts of 2-(β-carboxyethyl)-2-ethylhexaldehyde was heated in a slow stream of nitrogen while the temperature was gradually increased during three hours from 90° to 200° C. The system was evacuated and heated an additional three hours at 200°–260° C. at 1 mm. pressure. The product was a transparent orange resin.

*Example 13*

A mixture of 6.52 parts of methyl aldehydo stearate (obtained by the addition of carbon monoxide and hydrogen to methyl oleate) and 3.44 parts of decamethylenediamine was heated in nitrogen for one hour at 150° C., for two hours at 215° C., and finally for eight hours at 220°–250° C. at 1 mm. pressure. The product was a

Example 14

A mixture of 5.76 parts of ethyl β-aldehydo butyrate and 6.88 parts of decamethylenediamine was heated in a slow stream of nitrogen for two hours at 160° to 200° C. and then for ten hours at 210°–220° at 1 mm. pressure. The product was a tacky, orange, slightly elastic resin, insoluble in ethylene dichloride and in butanol.

We claim:

1. A process for preparing resinous materials which comprises condensing by heating together an aldehydo non-aromatic carboxylic acid, having one aldehydo and one carboxylic group as the sole reacting functional groups thereof and having two to sixteen carbon atoms in a chain between said functional groups, and a polyamine having as the sole reacting functional groups thereof hydrogen-bearing amine groups, at least one of which is a primary amine group, said amine groups being separated by a group containing at least four carbon atoms, the amount of said polyamine being reacted providing a proportion of a said primary amine group which is chemically equivalent to the aldehydo group of said carboxylic acid.

2. A process for preparing resinous materials which comprises reacting by heating together (a) a carboxylic compound selected from the group consisting of aldehydo non-aromatic carboxylic acids, having one aldehydo and one carboxyl group as the sole reacting functional groups thereof and having two to sixteen carbon atoms in a chain between said functional groups, and esters of said acids and a saturated aliphatic alcohol of one to eight carbon atoms and (b) a polyamine having as the sole reacting functional groups thereof hydrogen-bearing amine groups, at least one of which is a primary amine group, said amine groups being separated by a group containing at least four carbon atoms, the amount of said polyamine being reacted providing a proportion of a said primary amine group which is chemically equivalent to the aldehydo group of said carboxylic compound.

3. A process for preparing resinous materials which comprises condensing by heating together an aldehydo non-aromatic carboxylic acid and an aliphatic diprimary amine, said acid having one aldehydo and one carboxylic group as the sole reacting functional groups thereof and having two to sixteen carbon atoms in a chain between said functional groups, the aldehydo and carboxylic groups being separated by a chain of at least two carbon atoms, said amine having two primary amine groups as the sole reacting functional groups thereof and an alkylene chain of four to ten carbon atoms, the two amine groups being separated by at least four intervening carbon atoms and the amount of said amine being substantially chemically equivalent to said acid.

4. A process for preparing resinous materials which comprises reacting by heating together below 300° C. one molar proportion of decamethylene diamine and one molar proportion of 2-(beta-carboxyethyl)-2-ethylbutyraldehyde.

5. A process for preparing resinous materials which comprises reacting by heating together below 300° C. one molar proportion of hexamethylene diamine and one molar proportion of 2-(beta-carboxyethyl)-2-ethylbutyraldehyde.

6. A product obtained by the process of claim 2.

7. The product obtained by the process of claim 4.

8. The product obtained by the process of claim 5.

HERMAN A. BRUSON.
WARREN D. NIEDERHAUSER.

REFERENCES CITED

The following references are of record in the file of this patent:

UNITED STATES PATENTS

| Number | Name | Date |
|---|---|---|
| 2,342,607 | Bruson et al. | Feb. 22, 1944 |